United States Patent
Robinson (10) Patent No.: US 11,117,217 B1
(45) Date of Patent: Sep. 14, 2021

(54) METAL FILM FOR ADDITIVE METAL MANUFACTURING

(71) Applicant: National Technology & Engineering Solutions of Sandia, LLC, Albuquerque, NM (US)

(72) Inventor: David Robinson, Hayward, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 553 days.

(21) Appl. No.: 15/693,040

(22) Filed: Aug. 31, 2017

(51) Int. Cl.
| | |
|---|---|
| B33Y 70/00 | (2020.01) |
| B23K 26/342 | (2014.01) |
| B33Y 10/00 | (2015.01) |
| C23F 1/02 | (2006.01) |
| B23K 103/16 | (2006.01) |
| B32B 5/22 | (2006.01) |

(52) U.S. Cl.
CPC .......... B23K 26/342 (2015.10); B33Y 10/00 (2014.12); B33Y 70/00 (2014.12); *B23K 2103/16* (2018.08); *B32B 5/22* (2013.01); *C23F 1/02* (2013.01)

(58) Field of Classification Search
CPC ........ B32B 5/22; B23K 26/342; B23K 26/00; B33Y 10/00; B33Y 70/00; C23F 1/02
USPC ....................................................... 428/548
See application file for complete search history.

(56) References Cited

U.S. PATENT DOCUMENTS

| | | | |
|---|---|---|---|
| 6,420,954 B1* | 7/2002 | Ahn | H01F 17/0033 257/E27.046 |
| 2008/0062214 A1* | 3/2008 | Silverbrook | B22F 3/008 347/10 |
| 2018/0015671 A1* | 1/2018 | Sandstrom | B23K 26/342 |
| 2018/0243977 A1* | 8/2018 | Meinders | B28B 1/001 |

OTHER PUBLICATIONS

Visser et al., "Toward 3D Printing of Pure Metals by Laser-Induced Forward Transfer", 2015, Material Views, Wiley, URL: <https://onlinelibrary.wiley.com/doi/epdf/10.1002/adma.201501058>, pp. 4087-4092 (Year: 2015).*
Adrian, et al., "A Study of the Mechanism of Metal Deposition by the Laser-Induced Forward Transfer Process", In Journal of Vacuum Science & Technology B: Microelectronics Processing and Phenomena, vol. 5, 1987, pp. 1490-1494.
Auyeung, et al., "Laser Forward Transfer Using Structured Light", In Optics Express, vol. 23, No. 1, Jan. 12, 2015, pp. 422-430.
(Continued)

*Primary Examiner* — Humera N. Sheikh
*Assistant Examiner* — Katherine A Christy
(74) *Attorney, Agent, or Firm* — Medley, Behrens & Lewis, LLC (57) ABSTRACT

A metal film for use by an additive manufacturing apparatus is described herein. The metal film has a support structure and metal voxels removably attached to the support structure by respective junctions. When a metal voxel in the metal film is impacted by an energy pulse from an energy source of the additive manufacturing apparatus, one or more junctions that attach the metal voxel to the support structure are broken, resulting in the metal voxel detaching from the metal film (at a desired location in a two-dimensional plane).

10 Claims, 8 Drawing Sheets

(56) References Cited

OTHER PUBLICATIONS

Hirt, et al., "Additive Manufacturing of Metal Structures at the Micrometer Scale", In Advanced Materials, vol. 29, 2017, pp. 1-30.
Pique, et al., "Laser Forward Transfer for Digital Microfabrication", In Proceedings of SPIE, 2011, vol. 7921, pp. 792104-1-792104-6.
Pique, et al., "Laser-Induced Forward Transfer of Functional Materials: Advances and Future Directions", In Journal of Laser Micro/Nanoengineering, vol. 9, No. 3, 2014, pp. 192-197.
Roder, et al., "Physical Model for the Laser Induced Forward Transfer Process", In Applied Physics Letters, vol. 100, 2012, pp. 071603-1-071603-3.
Zenou, et al., "Printing of Metallic 3D Micro-Objects by Laser Induced Forward Transfer", In Optics Express, vol. 24, No. 2, Jan. 25, 2016, pp. 1431-1446.

\* cited by examiner

METAL FILM FOR ADDITIVE METAL MANUFACTURING

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Metal additive manufacturing is a category of manufacturing techniques that produces three-dimensional objects layer-by-layer from a metal or metal-based material. Each layer is generally thin, such as between 10 to 150 μm. Metal additive manufacturing is a promising technology because it offers design flexibility not available to traditional machining approaches, and is empowered by software that can optimize properties of additively manufactured parts. For example, the composition and geometry of each layer of a three-dimensional object can be stored in a computer file. A metal additive manufacturing apparatus can deposit materials in accordance with each layer stored in the computer file so as to form the three-dimensional object. Objects produced via metal additive manufacturing often produce less waste material and can be manufactured using less energy than traditional manufacturing techniques.

Prevalent metal additive manufacturing techniques utilize laser sintering of metal powders along with three-dimensional modeling software. Laser sintering of a metal powder involves feeding a layer of metal powder (e.g., a collection of metal particles with diameters ranging from between 10 to 100 μm) into the path of a laser. Representative metal powders include powders formed from steel, cobalt-chromium, aluminum, and titanium. The laser micro-welds a portion of the metal powder onto a substrate. This process is repeated for each layer of an object until the three-dimensional object is fully formed.

There are numerous drawbacks associated with laser sintering of metal powders. Metal powders are often flammable and toxic, and sometimes carcinogenic. Metal powders can be especially dangerous when aerosolized. Stray metal powders can cause short circuits in electrical parts. Additionally, metal powders often have a broad distribution of particle sizes and shapes, leading to reduced control of part geometry and properties. Furthermore, certain types of metals are not suitable for use in laser sintering. Unsintered metal powders can also become trapped in a manufactured part, which can be difficult or impossible to remove. Impurities such as oxides and organic materials are also easily incorporated into metal powders, which can further reduce the quality of a three-dimensional object produced via laser sintering of metal powders.

SUMMARY

The following is a brief summary of subject matter that is described in greater detail herein. This summary is not intended to be limiting as to the scope of the claims.

Described herein are various technologies pertaining to metal additive manufacturing. More specifically, a metal film that can be used in a metal additive manufacturing apparatus is described herein. The metal film comprises a plurality of metal voxels and a support region. Each metal voxel in the plurality of metal voxels is attached to the support region by at least one junction. Each metal voxel can be made of one or more of a transition metal, a post-transition metal, or a metalloid. Furthermore, each metal voxel can have a different geometry, such as cubic or cylindrical. Each junction may be configured with a property that enables each metal voxel in the plurality of metal voxels to be detached from the support region. For example, each junction can have a lower melting point than a melting point of the support region. In another example, each junction can have a thickness less than a thickness of the support region. In operation, a first metal voxel can be detached from the metal film by applying a first energy pulse from an energy source to form a first layer of a three-dimensional object, where the energy pulse is applied to the first metal voxel. A second metal voxel can then be detached from the metal film and deposited on the first layer by applying a second energy pulse from the energy source to form a second layer of the three-dimensional object, where the second energy pulse is applied to the second metal voxel. A third energy pulse emitted from the energy source can cause the first layer to become fused with the second layer. This process can be repeated several times to form a plurality of layers.

Further described herein is an apparatus for metal additive manufacturing that can utilize the metal film described previously. The apparatus comprises an energy source (e.g., a laser), a receiver surface, a first spool, and a second spool. A metal film comprising a plurality of metal voxels and a support region can be suspended between the first spool and the second spool, wherein at least some of the metal film is wound around the first spool. For instance, a majority of the metal film may initially be wound around the first spool with one end of the metal film attached to the second spool. A first subset of metal voxels can be detached from the metal film by emitting a first series of energy pulses from the energy source at the first subset of metal voxels. The first series of energy pulses causes the first subset of metal voxels to be deposited on the receiver surface, thereby forming a first layer of a three-dimensional object. A motor may then rotate the first spool and the second spool such that a portion of the metal film with intact metal voxels (i.e., not removed from the metal film) is suspended between the first spool and the second spool and above the first layer. A second subset of metal voxels can then be detached from the metal film by emitting a second series of energy pulses from the energy source at the second subset of metal voxels. The second series of energy pulses causes the second subset of metal voxels to be deposited on at least a portion of the first layer. The apparatus can then apply a third series of energy pulses from the energy source in order to fuse the first layer and the second layer. This process can be repeated several times in order to generate a plurality of layers, thereby forming the three-dimensional object.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to metal additive manufacturing are now described with reference to the drawings, wherein like reference numerals are used to refer to like elements throughout. In the following description, for purposes of explanation, numerous specific details are set forth in order to provide a thorough understanding of one or more aspects. It may be evidence, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is being described as being carried out by multiple components.

Moreover, the term "or" is intended to mean an inclusive "or" rather than exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Disclosed herein is a metal film that can be used in a metal additive manufacturing apparatus in order to generate a three-dimensional object. In an embodiment, the metal film may comprise a plurality of metal voxels and a support region. Each metal voxel in the plurality of metal voxels is removably attached to the support region via at least one junction. The at least one junction for each metal voxel is configured such that upon application of an energy pulse directed at the metal voxel, the junction will weaken and break while leaving both the support region and the metal voxel intact. For example, the at least one junction attaching a metal voxel to the support region may have a lower melting point than a melting point of the support region and the metal voxel, such that upon an application of an energy pulse to the metal voxel, the at least one junction will melt before the metal voxel, thereby detaching the metal voxel from the support. In another example, the at least one junction may be thinner than a thickness of the support region and thinner than a thickness of a metal voxel such that when a force is applied to the metal film, the at least one junction for the metal voxel will break, thereby releasing the metal voxel from the support region. In an embodiment, the at least junction for each metal voxel is made of the same material as the support region. In another embodiment, the at least one junction is made of a different material than the support region.

As noted above, as a result of the at least one junction breaking, the metal voxel is detached from the support structure (and thus is detached from the metal film) and is deposited on a receiver surface, thereby forming a first layer of the three-dimensional object. A new portion of the metal film can then be positioned over the first layer, and a second energy pulse may be applied to a second metal voxel in the new portion of the metal film causing the second metal voxel to be detached from the metal sheet and deposited on the first layer, thus forming a second layer. A third energy pulse may then be applied to the first layer and the second layer such that the first layer becomes fused to the second layer. This process may be repeated several times in order to generate a plurality of layers.

The metal voxels of the metal film may have different geometries. In an embodiment, each metal voxel in the plurality of metal voxels may be cubic. When the metal voxels are cubic, each metal voxel can have a side length ranging from 10 to 500 µm. For example, each metal voxel can have a side length ranging from 15 to 80 µm, from 30 to 50 µm, or from 40 to 45 µm. In another embodiment, each metal voxel in the plurality of metal voxels may be cylindrical. In this embodiment, each metal voxel can have a radius ranging from 5 to 250 µm and a height ranging from 10 to 500 µm. For example, each metal voxel can have a radius ranging from 10 to 90 µm and a height ranging from 20 to 90 µm, a radius ranging from 30 to 70 µm and a height ranging from 35 to 70 µm, or a radius ranging from 40 to 50 µm and a height ranging from 45 to 55 µm. In yet another embodiment, each metal voxel in the plurality of metal voxels may be triangular prismatic or hexagonal prismatic. In this embodiment, each metal voxel can have a side length ranging from 5 to 500 µm and a height ranging from 10 to 500 µm. For example, each metal voxel can have a side length ranging from 10 to 90 µm and a height ranging from 20 to 90 µm, a side length ranging from 30 to 70 µm and a height ranging from 35 to 70 µm, or a side length ranging from 40 to 50 µm and a height ranging from 45 to 55 µm. Additionally, more than one voxel geometry may be present in the metal film. For example, for a given metal film, a first half of the plurality of metal voxels may be cubic, whereas a second half of the plurality of metal voxels may be cylindrical. Furthermore, the sizes of the metal voxels in the metal film need not be uniform. For example, for a given metal film with cubic voxels, a first half of the plurality of metal voxels may have a side length of 15 µm and a second half of the plurality of metal voxels may have a side length of 50 µm.

Each metal voxel in the plurality of metal voxels can be made of a transition metal, such as Scandium, Titanium, Vanadium, Chromium, Manganese, Iron, Cobalt, Nickel, Copper, Zinc, Silver, Palladium, Rhodium, Gold, Platinum, Osmium, Iridium, Molybdenum, Tungsten, Tantalum, or a post-transition metal, such as Aluminum, Tin, Lead, or Bismuth. Each metal voxel can also be made of combinations of the aforementioned materials (i.e. metal alloys) or combinations (alloys) of the aforementioned materials and other elements. Additionally, voxels made of different materials may be present in the metal film. For example, for a given metal film, a first half of the plurality of metal voxels may be made of Copper, whereas a second half of the plurality of metal voxels may be made of Aluminum.

The support region may be made of the same material or a different material than the metal voxels. Thus, the support region can be made of a polymer, a transition metal, a post-transition metal or a metalloid. As noted previously, the at least one junction may be made of the same material as the support region.

In an embodiment, the metal film may have a length ranging from 0.1 to 100 m, a width ranging from 1 to 50 cm, and a maximum depth ranging from 10 to 1000 μm. For example, the metal film may have a length ranging from 1 to 10 m, a width ranging from 5 to 10 cm, and a depth ranging from 50 to 150 μm, or the metal film may have a length ranging from 10 to 50 m, a width ranging from 10 to 20 cm, and a depth ranging from 100 to 500 μm. In an embodiment, the metal film may be flexible such that the metal film can be wound around a spool.

The metal film described above may be manufactured in a number of ways. For example, the metal film may be manufactured by stamping a metal foil, extrusion of a foil using patterned rollers, electrodeposition or dip coating of voxels through a patterned mask material onto a continuous substrate, gravure printing of metallic inks, or casting a metal-polymer composite from a solution.

The metal film described above has various advantages compared to traditional metal powders used in metal additive manufacturing processes. First, metal films are safer to use than metal powders as they cannot be inhaled. Second, unlike metal powders, the size and geometry of voxels in the metal film can be more precisely controlled, thus leading to creation of three-dimensional objects having strict tolerances. Third, the metal film may be wound around a spool, thus enabling a large amount of metal film to be stored in a relatively small space. Fourth, faster layer print times can be achieved when compared to traditional techniques, as unused portions of metal film can be rotated into the path of an energy source (e.g., with a one or more spools) as voxels are detached from the metal film. Fifth, unused portions of the metal film can easily be recovered and recycled. Sixth, incorporation of several material types in the same part of a three-dimensional object is much more straightforward, with few practical constraints on the spatial location of the different materials, and with little risk of cross-contamination of the feedstock material.

Figure 1:
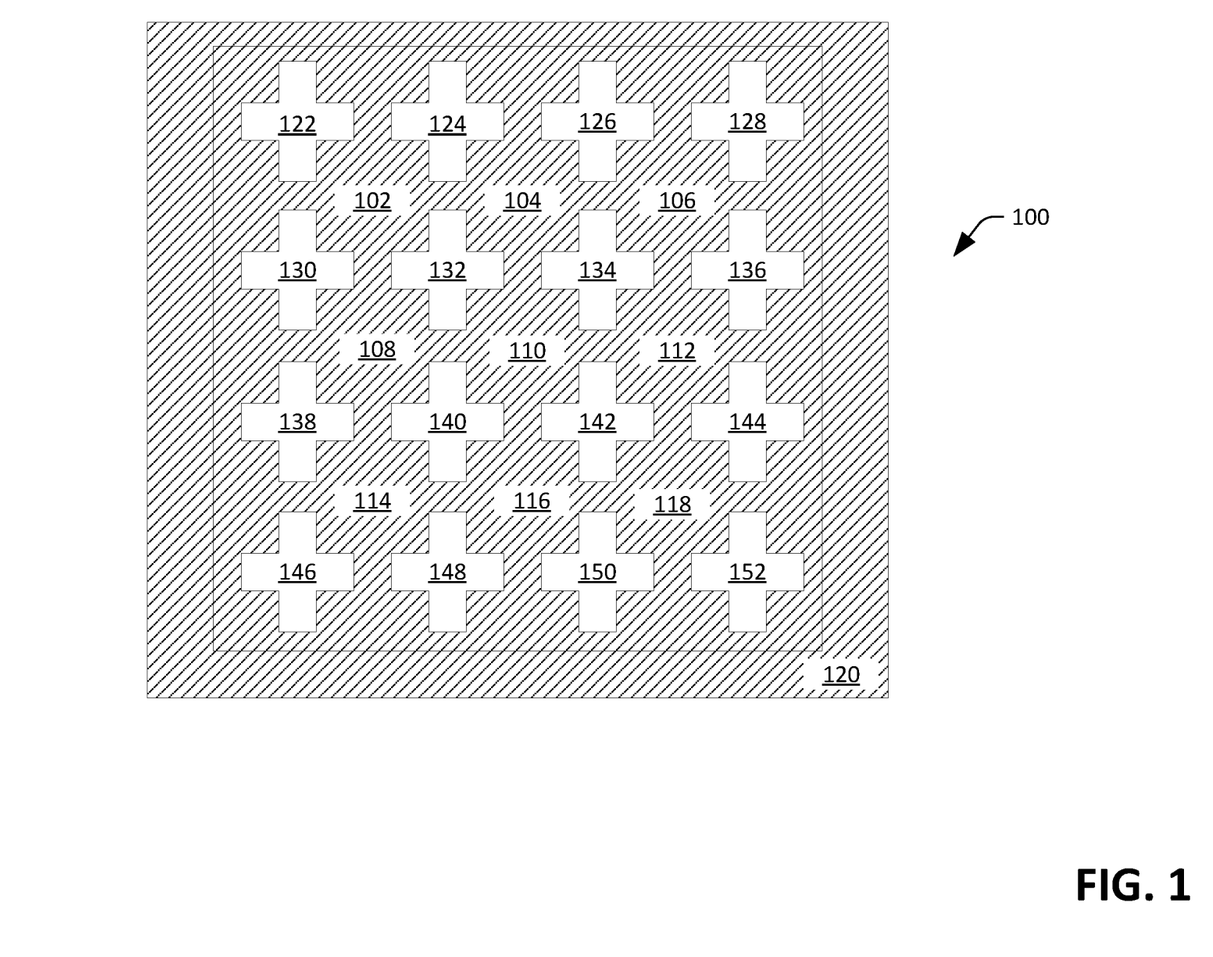
FIG. 1 is an overhead view of a metal film having a plurality of metal voxels that can be used by a metal additive manufacturing apparatus to form a three-dimensional object.

Turning now to FIG. 1, an exemplary metal film 100 that can be used in a metal additive manufacturing apparatus is illustrated. The metal film comprises a plurality of metal voxels 102-118 and a support region 120. In the exemplary metal film 100, each metal voxel is cubic, but it is understood that other voxel geometries are possible. The support region 120 and each metal voxel in the plurality of metal voxels can be made of the materials listed above. Additionally, the metal film 100 has a plurality of gaps 122-152. Boundaries of each metal voxel are defined by the gaps. Each metal voxel is held in the metal film by thin, narrow regions that extend from each metal voxel. An energy source can apply an energy pulse toward a metal voxel to detach the metal voxel from the metal film 100 and deposit the metal voxel onto a substrate, which can be either a receiver surface or a layer of a three-dimensional object. Alternatively, separate energy pulses can be used for the detachment and deposition steps. For example, a first metal voxel 104 can be detached from the metal film 100 by applying an energy pulse towards the first metal voxel 104, thereby detaching the first metal voxel 104 from the metal film 100. As the regions coupling the first metal voxel 104 to the metal film 100 are so thin, they will melt when the energy pulse is applied to the first voxel 104, and the first voxel 104 will detach from the metal film 100. This process can be repeated for other metal voxels in the metal film 100 in order to form a layer of a three-dimensional object, where the layer has a desired shape.

Figure 2:
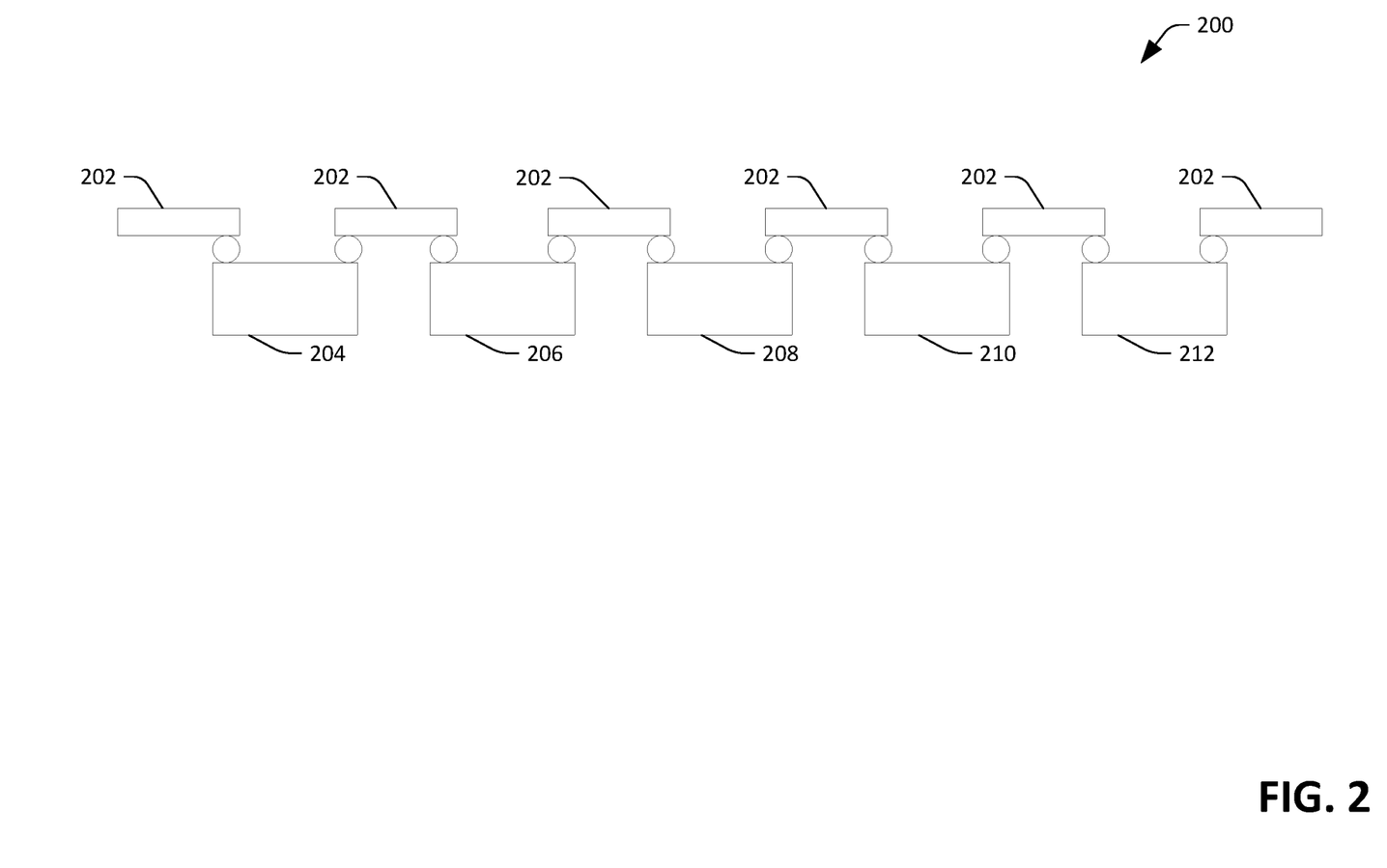
FIG. 2 is a cross-sectional view of a metal film that can be used by a metal additive manufacturing apparatus to form a three-dimensional object.

With reference to FIG. 2, a cross-sectional view of a metal film 200 that can be used in a metal additive manufacturing apparatus is illustrated. The metal film 200 comprises a plurality of metal voxels 204-212 removably attached to a support region 202. In the metal film 200, each metal voxel is rectangular prismatic, but it is understood that other voxel geometries are possible. The support region 202 and each metal voxel in the plurality of metal voxels 204 can be made of the materials listed above. In the metal film 200, each metal voxel in the plurality of metal voxels is attached to the support region via thin junctions (depicted as circles in FIG. 2). An energy source can apply an energy pulse to a metal voxel on the metal film 200 to cause the metal voxel to be detached from the metal film 200 and deposited on a substrate, which can be either a receiver surface or a layer of a three-dimensional object. For example, an energy source can apply an energy pulse at a first metal voxel 204, thereby causing the junctions for the first metal voxel 204 to melt. As a result of the junctions for the first metal voxel 204 melting, the first metal voxel 204 is detached from the metal film 200 and deposited on a substrate, which can be either a receiver surface or a layer of a three-dimensional object. This process can be repeated for other metal voxels in the metal film 200 to form a layer of a three-dimensional object, where the layer has a desired shape.

Figure 3:
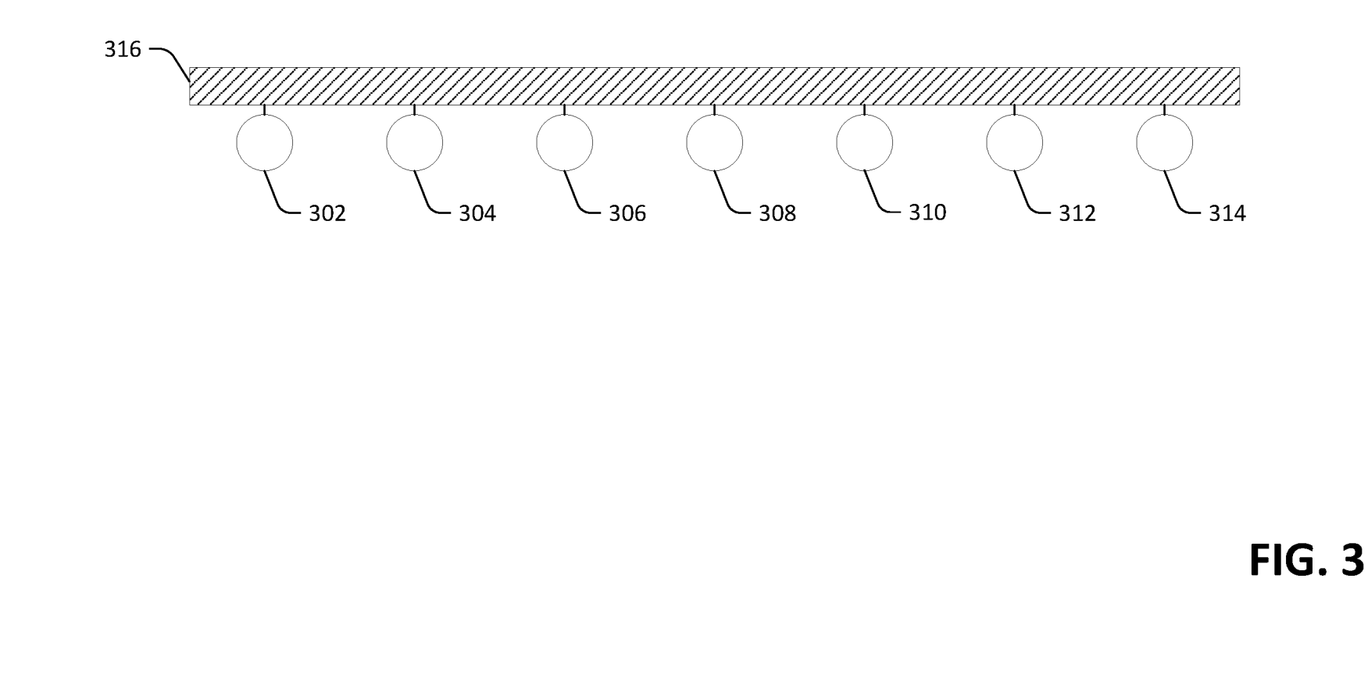
FIG. 3 is a cross-sectional view of another metal film that can be used by a metal additive manufacturing apparatus to form a three-dimensional object.

Now referring to FIG. 3, a cross-sectional view of a further exemplary metal film 300 that can be used in a metal additive manufacturing apparatus is illustrated. The metal film 300 comprises a plurality of metal voxels 302-314 and a support region 316. In the metal film 300, each metal voxel is cylindrical, but it is understood that other voxel geometries are possible. Each metal voxel in the plurality of metal voxels 302-314 is attached to the support region 316 via a junction (illustrated as a thin line connecting the voxel to the support region 316). The support region 316 and each metal voxel in the plurality of metal voxels 302-314 can be made of the materials listed above; however, in the metal film 300, each metal voxel is made of a first material, whereas the support region is made of a second material. For example, each metal voxel can be made of copper and the support region can be made of a polymer. An energy source can apply an energy pulse to a metal voxel in the plurality of metal voxels 302-314 to detach the metal voxel from the metal film 300. For example, an energy source can apply an energy pulse to a first metal voxel 304, causing the junction for the first metal voxel 304 to detach from the metal film 300, thereby depositing the first metal voxel 304 on a substrate, which can be a receiver surface or a layer of a three-dimensional object. This process can be repeated for different metal voxels in the metal film 300 to form a desired layer of the three-dimensional object.

Figure 4:
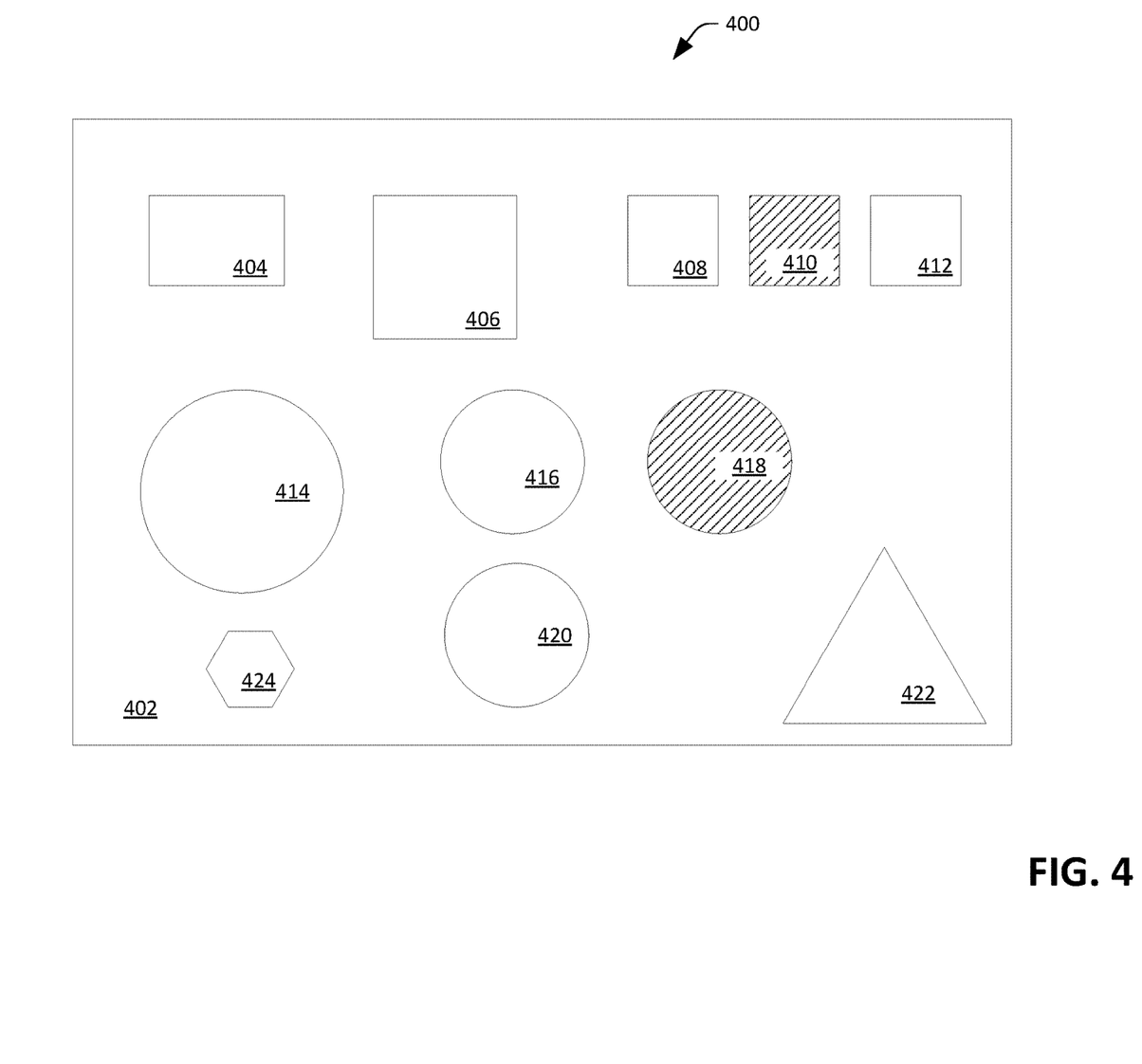
FIG. 4 is an overhead view of a metal film with different types of metal voxels.

With reference to FIG. 4, an overhead view of an exemplary metal film 400 with different types (sizes and shapes)

of voxels is illustrated. The metal film 400 comprises a support region 402 with a plurality of metal voxels 404-422 attached thereto by one or more junctions. As noted above, the types of metal voxels in the metal film 400 can vary. For instance, the metal film 400 includes a metal rectangular prismatic voxel 404, metal cubic voxels 406-412, metal cylindrical voxels 414-420, a metal triangular prismatic voxel 422, and a metal hexagonal prismatic voxel 424. Metal voxels having identical geometry can vary in size. For instance, the metal sheet 400 includes a metal cubic voxel 406 having a first side length, as well as another metal cubic voxel 408 having a second side length, wherein the first side length is greater than the second side length. Additionally, metal voxels in the metal sheet can be made of different materials. For instance, metal voxels 404-408, 412-416, and 420-422 can be made of a first material, whereas metal voxels 410 and 418 can be made of a second material. Further, the metal voxels 404-422 can be patterned in the metal film 400 in a variety of patterns (i.e., the pattern may accord to the 3D model that is to be generated through use of the metal film 400).

The metal film 400 can be useful in creating three-dimensional objects with overhangs, that is, an object that includes layers with metal voxels that are not supported by a previous layer. For instance, an energy source can apply energy to the metal rectangular prismatic voxel 404, causing the metal rectangular prismatic voxel 404 to release from the metal film 400, thereby creating a portion of a first layer. The metal film 400 can then be moved laterally so that a first portion of the metal cubic voxel 406 partially overlaps the portion of the first layer formed by the released metal rectangular prismatic voxel 404, while a second portion of the metal cubic voxel 406 is unsupported by the first layer. The metal cubic voxel 406 can then be released from the metal film 400 and fused with the first portion of the metal rectangular prismatic voxel 404 by applying energy with the energy source, thus forming an overhang beneath the second portion of the metal cubic voxel 406.

Figure 5:
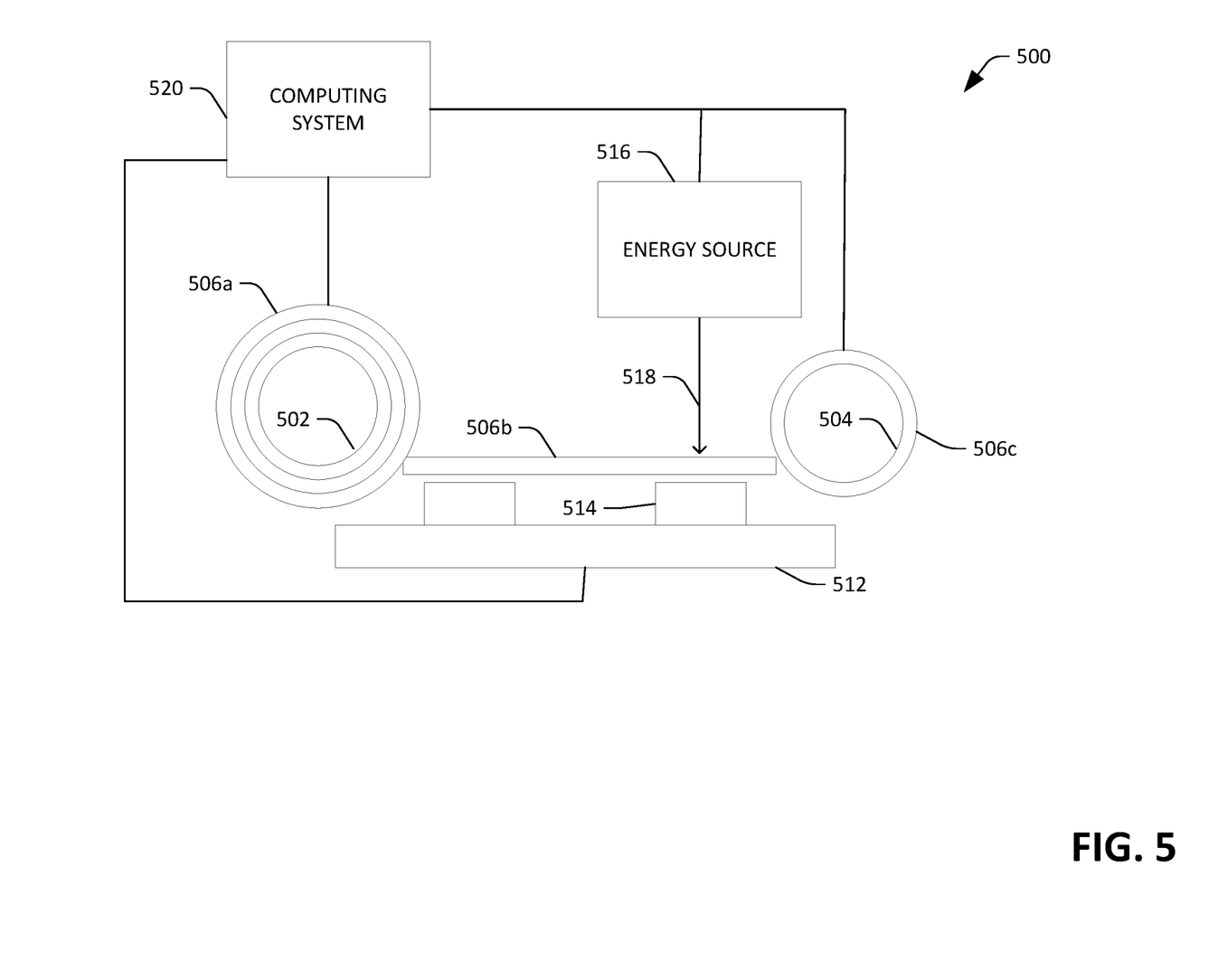
FIG. 5 is a depiction of a metal additive manufacturing apparatus.

Turning now to FIG. 5, an exemplary apparatus 500 that can be used to generate a three-dimensional object is illustrated. The apparatus 500 comprises a first spool 502 and a second spool 504. Furthermore, the apparatus 500 comprises a receiver surface 512. The receiver surface 512 can be configured to receive the first layer of a three-dimensional objected generated from a metal film. In general, the receiver surface 512 can be made of a material that can be separated from the finished three-dimensional object without causing deformation to the finished three-dimensional object. In a non-limiting example, the receiver surface 512 may be made of a glass, a ceramic, a metal, a metal alloy, or a polymer. The receiver surface 512 can have a thermal conductivity ranging from 1 to 100 K·m·W$^{-1}$ so as to prevent a metal voxel from melting. For example, the receiver surface 512 can have a thermal conductivity ranging from 20 to 90 K·m·W$^{-1}$, from 30 to 70 K·cm·W$^{-1}$, or from 40 to 50 K·m·W$^{-1}$. When the receiver surface 512 is made of a glass or a ceramic, the surface of the receiver surface 512 may be roughened so as to further facilitate separation of the finished three-dimensional object from the receiver surface 512.

The apparatus 500 further comprises a metal film 506 having three portions 506a, 506b, and 506c (discussed below). As described above, the metal film 506 comprises a plurality of metal voxels attached to a support region. Each metal voxel in the plurality of voxels may be made of a transition metal, such as Copper, a post-transition metal, such as Aluminum, or an alloy. Each metal voxel in the plurality of metal voxels may be attached to the support region by at least one junction. Each junction is configured to have a property such that the metal voxel attached to the junction will become detached from the support region when a threshold amount of energy is applied to the junction, without causing the metal voxel to be deformed or causing the metal film to break.

An unused portion 506a of the metal film 506 may be wound around the first spool 502. An exposed portion 506b of the metal film 506 may be suspended between the first spool 502 and the second spool 504 and above the receiver surface 512. A used portion 506c of the metal film 506 may be wound around the second spool 504. Both the first spool 502 and the second spool 504 can be coupled to a motor (not shown). The motor can cause the first spool 502 and the second spool 504 to rotate such that after a subset of metal voxels have been removed from the exposed portion 506b, the exposed portion 506b of the metal film 506 is moved to the second spool 504 and a new, unused portion of the metal film 506 is moved from the first spool 502 to occupy the former position of the exposed portion 508.

In order to ensure accurate positioning of metal voxels, a gap ranging from 10 to 400 μm can be maintained between the exposed portion 506b of the metal film and the receiver surface 512. In another example, the gap maintained can be less than or equal to a height of the metal voxels. For example, the gap between the exposed portion 506b of the metal film and the receiver surface 512 may range from 20 to 190 μm, from 50 to 100 μm, or from 70 to 80 μm. In an embodiment, the apparatus 500 may adjust the positions of the first spool 502 and the second spool 504 vertically as successive layers of the three-dimensional object 514 are deposited so as to maintain the gap between the exposed portion 506b of the metal film and the top layer of the three-dimensional object 514. In another embodiment, the apparatus 500 may adjust the position of the receiver surface 512 vertically as successive layers are deposited to maintain the gap.

In an embodiment, the apparatus 500 may comprise additional spools (not shown) so as to facilitate the simultaneous transfer of more than one type of voxel geometry and/or more than one type of voxel material to the receiver surface 512 or the top layer of a three-dimensional object. For example, the apparatus 500 may additionally comprise a second metal film suspended between a third spool and a fourth spool, wherein metal voxels in the second metal film are made of a different material than the metal voxels in the metal film 506. In another example, the metal voxels in the second metal film can have a different geometry than the metal voxels in the metal film 506. Thus, if a particular layer of a three-dimensional object requires more than one type of material, the apparatus 500 can deposit the layer without having to manually switch out the metal film 506 for a different metal film. This enables the apparatus 500 to construct the three-dimensional object 514 at a rapid speed.

The apparatus 500 additionally comprises an energy source (e.g., a laser) 516 configured to emit an energy pulse 518 directed at a metal voxel in the exposed portion of the metal film 606b. The amount of energy applied per metal voxel can be expressed in mJ/voxel. If the amount of energy applied is too low, the subset of metal voxels will not detach from the metal film 506 and hence a layer of the three-dimensional object 514 will not be formed. If the amount of energy applied is too high, the subset of metal voxels may be deformed (such as by melting) and/or portions of the support region of the metal film 506 may be deposited onto the receiver surface 512. This can reduce the quality of the three-dimensional object. Thus, the laser 516 can be configured to output an energy pulse 518 at each metal voxel in an amount ranging from 0.5 to 30 mJ/voxel. For example, the laser 516 can be configured to output an energy pulse 518 at each metal voxel in an amount ranging from 0.8 to 10 mJ/voxel, from 2 to 8 mJ/voxel, or from 2.5 to 5 mJ/voxel.

In order to form the three-dimensional object 514, it may be necessary for the apparatus 500 to move at least one of its components to detach particular metal voxels from the metal film 506. In an embodiment, the apparatus 500 can adjust the position of the receiver surface 512. In another embodiment, the apparatus 500 can adjust the position of the energy source 516. In yet another embodiment, the apparatus 500 may comprise a plurality of mirrors (not shown) that may be adjusted so as to direct the energy pulse 518 at different portions of the exposed portion 506b of the metal film 506.

The apparatus 500 may be controlled by a computing system 520. For instance, the computing system 520 may be communicatively coupled to the first spool 502, the second spool 504, the receiver surface 512, and the energy source 516 (depicted in FIG. 5 as lines attaching the computing system 520 to the aforementioned components). The computing system 520 may comprise a processor and memory, wherein the memory has a three-dimensional printing program loaded therein. In general, the three-dimensional printing program is configured to load a computer-aided design file (CAD file) for a three-dimensional object and to provide instructions to the apparatus 500 causing the apparatus 500 to generate successive layers based on the CAD file. The CAD file for a three-dimensional object includes a layer-by-layer representation of the three-dimensional object. For instance, the CAD file can include positions and types of metal voxels for a first layer of the three-dimensional object, positions and types of metal voxels for a second layer of the three-dimensional object, etc.

Exemplary operation of the apparatus 500 is now set forth. It is contemplated that the computing system 520 has loaded a CAD file for a three-dimensional object. The apparatus 500 rotates (by way of the motor) the first spool 502 and the second spool 504 such that a portion of the unused metal film 506a is positioned over the receiver surface 512 (thus becoming the exposed portion 506b). Based on data contained in the CAD file for the first layer of the three-dimensional object, the energy source 516 emits a first series of energy pulses at a first subset of metal voxels in the exposed portion 506b of the metal film 506. Each energy pulse in the first series of energy pulses is directed at a different metal voxel in the first subset of metal voxels. The first series of energy pulses causes the first subset of metal voxels to be detached from the exposed portion 506b metal film 506 and deposited on the receiver surface 512, thus forming a first layer of the three-dimensional object 514. As noted above, in an embodiment, in order to fully form a first layer of the three-dimensional object 514, the receiver surface 512 may be laterally translated in order to detach each metal voxel in the first subset of metal voxels. In another embodiment, the energy source 516 may be laterally translated. The first subset of metal voxels corresponds to the first (i.e., the bottom) layer of the three-dimensional object 514.

In order to maintain the gap between the exposed portion of the metal film 508 and the in-construction three-dimensional object 514, the apparatus 500 can cause the receiver surface 512 to be moved away from exposed portion 506b of the metal film 506 after the first layer is deposited on the receiver surface 512. For example, if the first layer is 10 μm thick, the apparatus 500 can cause the receiver surface 512 to be moved 10 μm downwards, thus maintaining the gap. In another embodiment, the apparatus 500 can cause the first spool 502 and the second spool 504 to be moved away from the three-dimensional object 514 so that the exposed portion 506b of the metal film 506 is maintained at a certain distance from a top layer of the three-dimensional object 514. For example, if the first layer is 10 μm thick, the apparatus 500 can cause the first spool 502 and the second spool 504 to be moved 10 μm upwards, thus maintaining the gap.

It is understood that it may be desirable to print three-dimensional objects with "overhangs," that is, an object that includes layers with metal voxels that are not supported by a previous layer. In order to accommodate such structures, a metal sheet with different sized metal voxels may be used.

Additionally or alternatively, a sacrificial support structure constructed from some of the metal voxels in the metal sheet 506 may be used to generate a three-dimensional object with an overhang. The support structure may support the overhang during the construction of the three-dimensional object 514. After the three-dimensional object 514 has been fully formed, the support structure may be removed.

The apparatus 500 can then cause the first spool 502 and the second spool 504 to rotate (by way of the motor) such that the exposed portion 506b becomes wound around the second spool 504 and that a new, unused portion of the metal film 506 is positioned over the receiver surface 512 occupying the former position of the exposed portion 506b. Based on data contained in the CAD file for a second layer of the three-dimensional object 514, the energy source 516 emits a second series of energy pulses at a second subset of metal voxels in the exposed portion 506b of the metal film 506. Each energy pulse in the second series of energy pulses is directed at a different metal voxel in the second subset of metal voxels. The second subset of metal voxels corresponds to the second layer of the three-dimensional object 514. The second series of energy pulses causes the second subset of metal voxels to become deposited on at least a portion of the first layer of the three-dimensional object 514. The energy source 516 may then apply a third series of energy pulses configured to fuse the metal voxels in the first layer to the metal voxels in the second layer.

The above-mentioned process is repeated for each layer contained in the CAD file for the three-dimensional object 514 in order form a plurality of layers, thus fully forming the three-dimensional object 514. If the three-dimensional object 514 includes sacrificial support structures, these structures can be removed in a post-processing step after each layer has been deposited.

It is understood that the metal film 506 may break length-wise or width-wise if too many of the metal voxels in the exposed portion 506b of the metal film 506 are removed from the metal film 506. If the metal film 506 breaks during the construction of the three-dimensional object 514, a new metal film will have to be loaded onto the first spool 502 and the second spool 508. Accordingly, the apparatus 500 can be configured to only remove a threshold number of metal voxels in the exposed portion 506b of the metal film 506 such that the exposed portion 506b of the metal film will not break length-wise or width-wise after metal voxels are removed. The metal film 506 may contain unpatterned and/or voxel-free regions that provide structural support to the metal film 506 after voxels have been removed.

Figure 6:
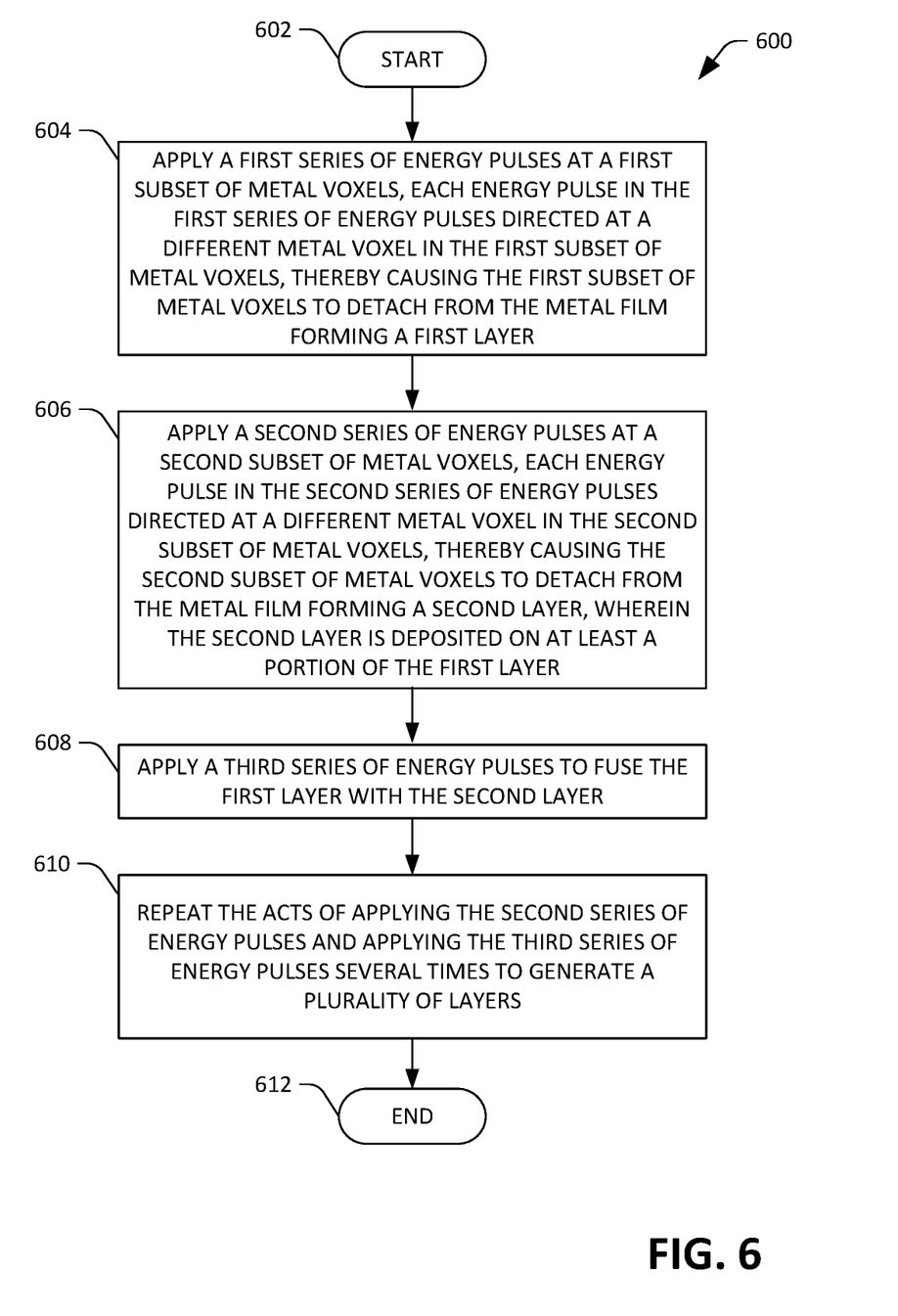
FIG. 6 is an exemplary methodology for manufacturing a three-dimensional object using a metal film.
Figure 7:
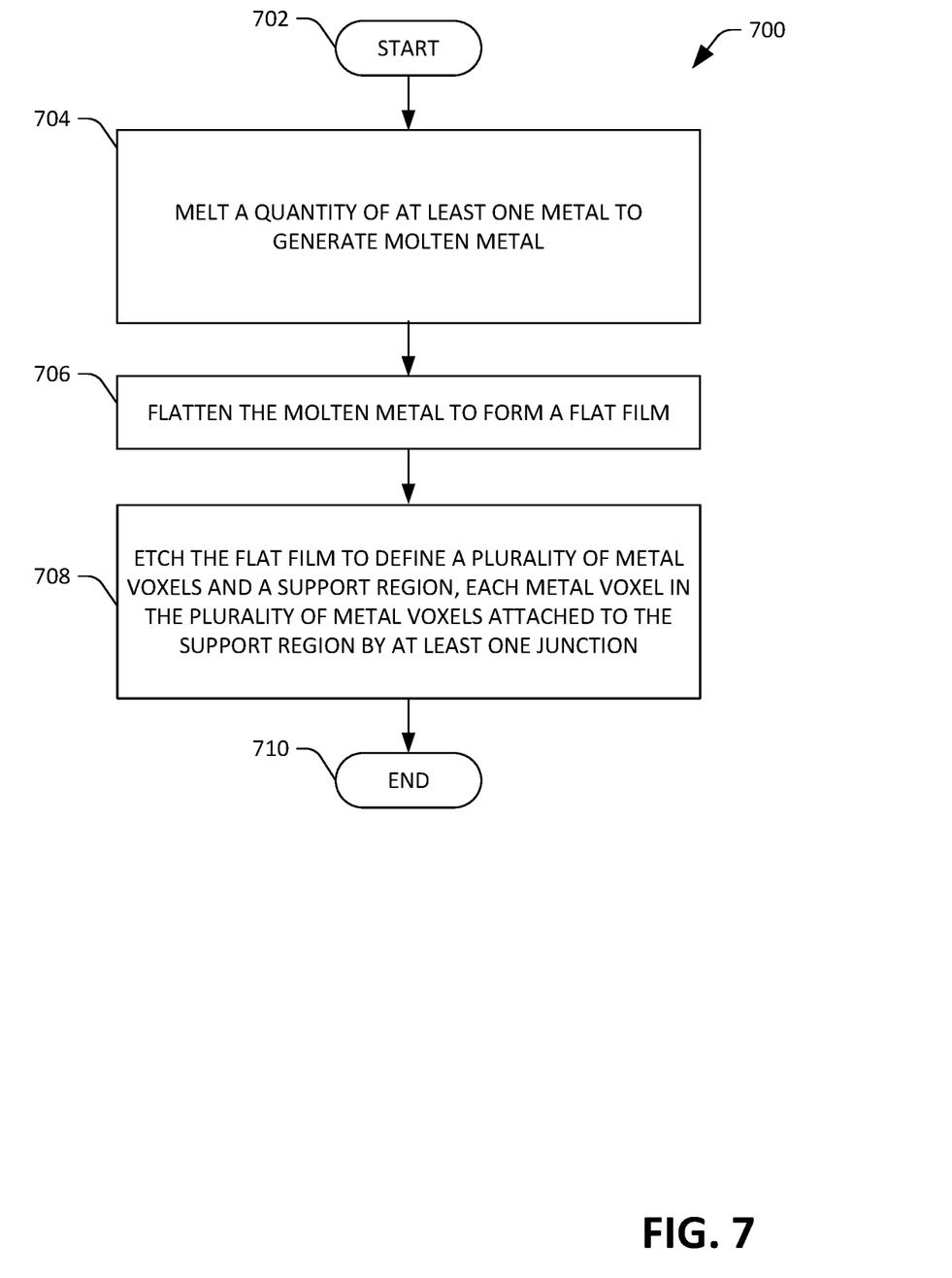
FIG. 7 is an exemplary methodology for manufacturing a metal film.

FIGS. 6-7 illustrate exemplary methodologies related to metal additive manufacturing using a metal film. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now to FIG. 6, a methodology 600 for manufacturing a three-dimensional object using a metal film comprising a plurality of metal voxels and a support region is illustrated. Each metal voxel in the plurality of metal voxels is attached to the support region by at least one junction. Each metal voxel is removeable from the support region upon application of an energy pulse from an energy source. The methodology 600 begins at 602, and at 604, a first series of energy pulses is applied to a first subset of metal voxels in the plurality of metal voxels. Each energy pulse in the first series of energy pulses is directed a different metal voxel in the first subset of metal voxels. The first series of energy pulses causes the first subset of metal voxels to detach from the metal film, thus forming a first layer of a three-dimensional object.

At 606, a second series of energy pulses is applied to a second subset of metal voxels in the plurality of metal voxels. Each energy pulse in the second series of energy pulses is directed at a different metal voxel in the second subset of metal voxels. The second series of energy pulses causes the second subset of metal voxels to detach from the metal film, thus forming a second layer of the three-dimensional object, wherein the second layer is deposited on at least a portion of the first layer. At 608, a third series of energy pulses is applied to fuse the first layer with the second layer. At 610, the acts of applying the second series of energy pulses and applying the third series of energy pulses is repeated several times to generate a plurality of layers, thus forming the three-dimensional object. The methodology 600 concludes at 612.

Turning now to FIG. 7, a methodology 700 for manufacturing a metal film comprising a plurality of metal voxels and a support region is illustrated. Each metal voxel in the plurality of metal voxels is attached to the support region by at least one junction. Each metal voxel is removeable from the support region upon application of an energy pulse from an energy source. The methodology 700 begins at 702, and at 704 a quantity of at least one metal is melted to generate molten metal. At 706, the molten metal is flattened to form a flat film. At 708, the flat film is etched to define a plurality of metal voxels and a support region. Each metal voxel in the plurality of metal voxels is attached to the support region by at least one junction. The methodology 700 concludes at 710.

Figure 8:
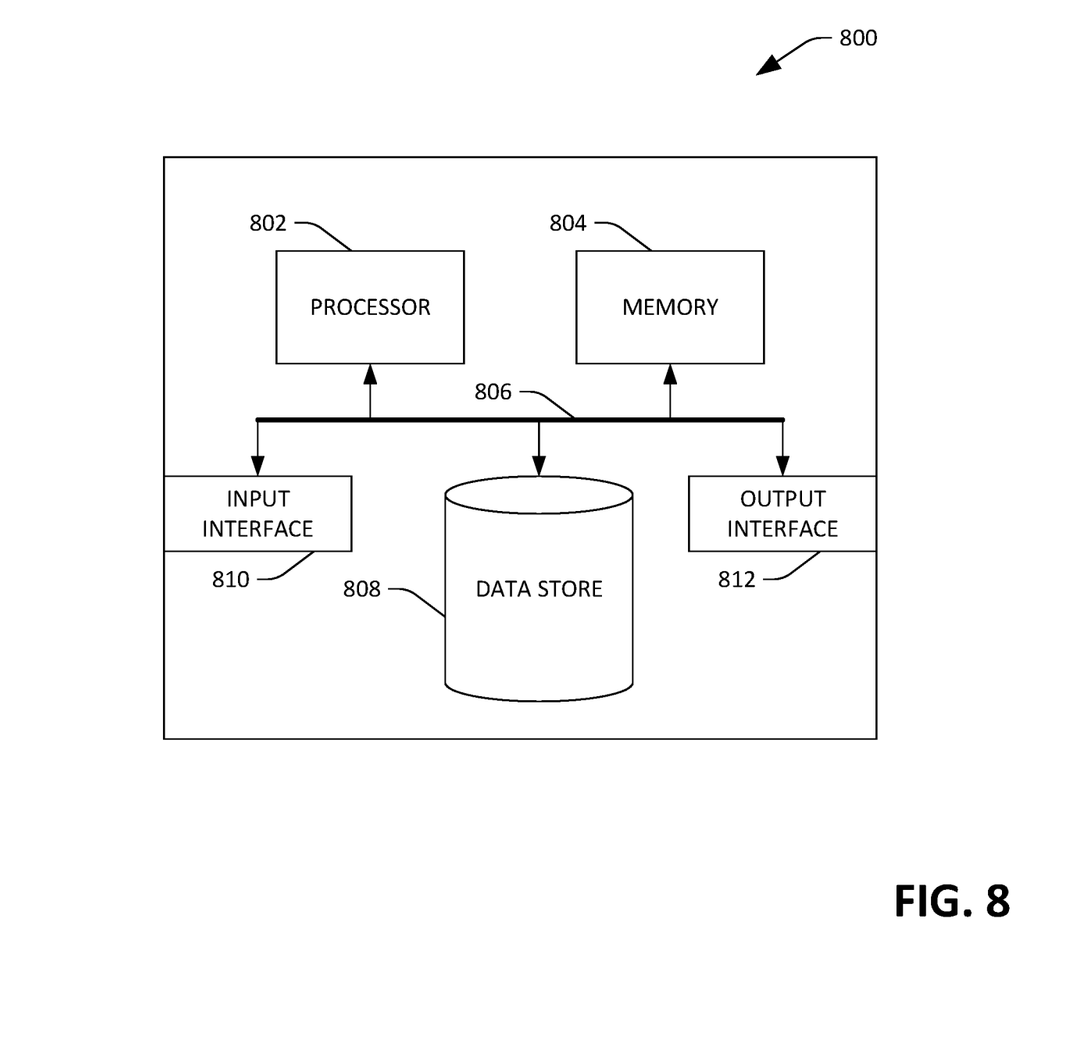
FIG. 8 is an exemplary computing system.

With reference to FIG. 8, a high-level illustration of an exemplary computing device 800 that can be used in accordance with the systems and methodologies disclosed herein is illustrated. For instance, the computing device 800 may be used in a system that facilitates constructing a three-dimensional object using a metal additive manufacturing process. By way of another example, the computing device 800 can be used to control an apparatus that constructs a three-dimensional object from a metal film. The computing device 800 includes at least one process 802 that executes instructions that are stored in a memory 804. The instructions may be, for instance, instructions for implementing functionality described as being carried out by one or more components discussed above or instructions for implementing one or more of the methods described above. The process 802 may access the memory 804 by way of a system bus 806. In addition to storing executable instructions, the memory 804 may also store CAD files for a variety of three-dimensional objects. The computing device 800 additionally includes a data store 808 that is accessible by the processor 802 by way of the system bus 806. The data store 808 may include executable instructions, CAD files, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces with computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrate as a single system, it is to be understood that the computing device 800 may be a distributed system. Thus, for instance, several devices may be in communication by way of a network connection and may collectively perform tasks described as being performed by the computing device 800.

Various functions described herein can be implement in hardware, software, or any combinations thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM, or other optical disk storage, magnetic disk storage or other magnetic storage devices, or any other medium that can be used to carry o store desired program code in the form of instructions or data structures that can be accessed by a computer. Disk and disc, as used herein, include compact disc (CD), laser disc, optical disk, digital versatile disc (DVD), floppy disk, and blu-ray disc (BD), where disks usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave are included in the definition of communication medium.

Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Not all embodiments disclosed herein must possess the characteristics discussed above. Furthermore, the claims are not to be limited by any such characteristics discussed herein unless recited in the claim itself.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent the term "includes" is used in either the detailed description or the claims, such term is intended to be inclusive in a manner similar to the term "comprising" as "comprising" is interpreted when employed as a transition word in a claim. The term "consisting essentially" as used herein means the specific materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A feedstock for use in a metal additive manufacturing apparatus, the feedstock comprising:
   a metal film, the metal film comprising:
      a plurality of metal voxels;
      a support region, wherein boundaries of the metal voxels in the plurality of metal voxels are defined by gaps in the support region of the metal film; and
   a plurality of junctions that attach the plurality of metal voxels to the support region, wherein each of the plurality of junctions is a member that extends between the support region and a metal voxel in the plurality of metal voxels across a gap in the gaps in the support region;
   wherein a first metal voxel in the plurality of metal voxels is attached to the support region by a first junction in the plurality of junctions, and further wherein the first metal voxel is removable from the support region upon application of an energy pulse from the metal additive manufacturing apparatus, wherein the first junction is configured to break upon application of the energy pulse such that the first metal voxel is detached from the support region and deposited onto a receiving surface.

2. The feedstock of claim 1, wherein voxels in a first subset of metal voxels in the plurality of metal voxels have a first voxel geometry, wherein voxels in a second subset of metal voxels in the plurality of metal voxels have a second voxel geometry.

3. The feedstock of claim 1, wherein each metal voxel in the plurality of metal voxels is made of at least one of Scandium, Titanium, Vanadium, Chromium, Manganese, Iron, Cobalt, Nickel, Copper, Zinc, Silver, Palladium, Rhodium, Gold, Platinum, Osmium, Iridium, Molybdenum, Tungsten, Tantalum, Aluminum, Tin, Lead, Bismuth, or combinations thereof.

4. The feedstock of claim 1, wherein the support region is made of a polymer, a metal, or a metalloid.

5. The feedstock of claim 1, wherein the first junction has a melting point lower than a melting point of the support region.

6. The feedstock of claim 1, wherein the first metal voxel is cubic.

7. The feedstock of claim 6, wherein the first metal voxel has a side length ranging from 10 to 500 μm.

8. The feedstock of claim 1, wherein the first metal voxel is cylindrical or hexagonal prismatic.

9. The feedstock of claim 8, wherein the first metal voxel has a height ranging from 10 to 500 μm.

10. The feedstock of claim 1, wherein the metal film has a depth ranging from 10 to 1000 μm.

* * * * *